Figure 1:
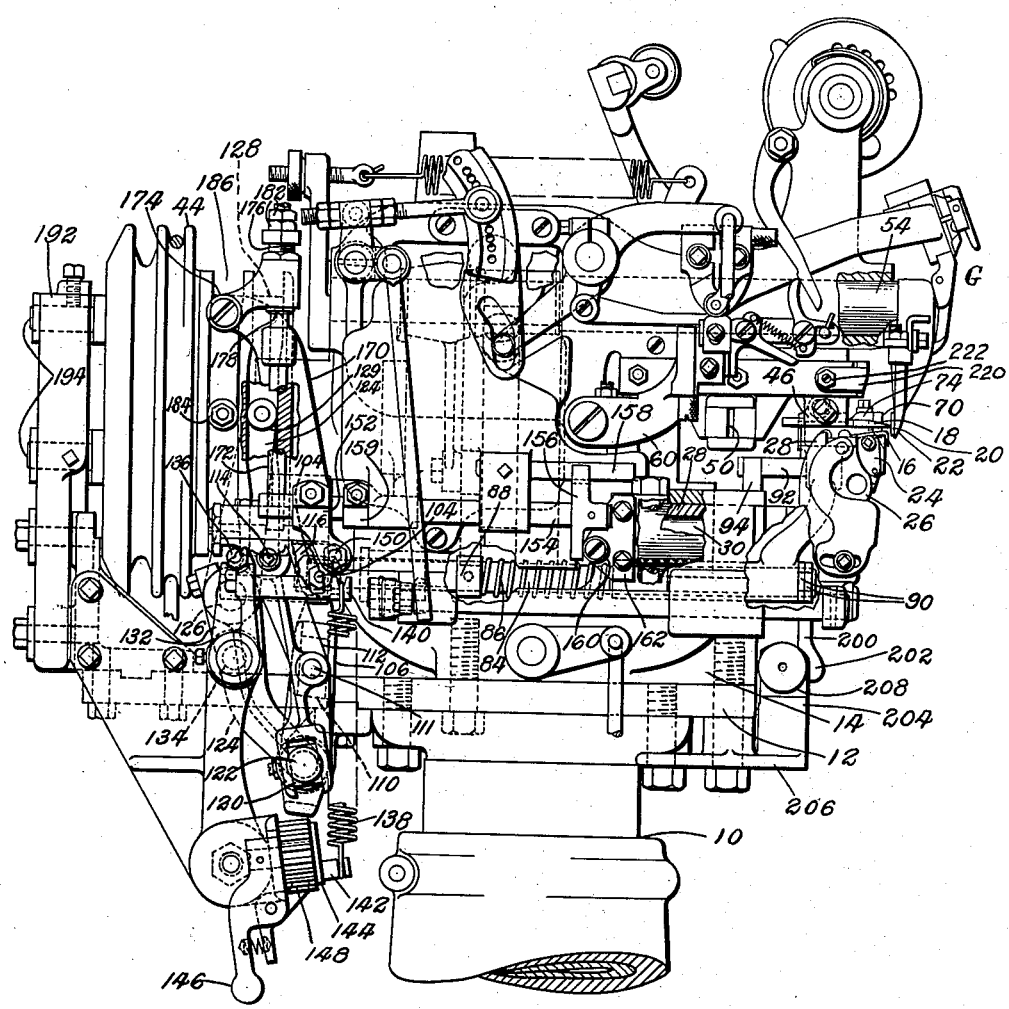

Sept. 24, 1940.   J. B. HADAWAY ET AL   2,215,501
MACHINE FOR OPERATING UPON SHOE SOLES
Filed Feb. 27, 1939   4 Sheets-Sheet 3
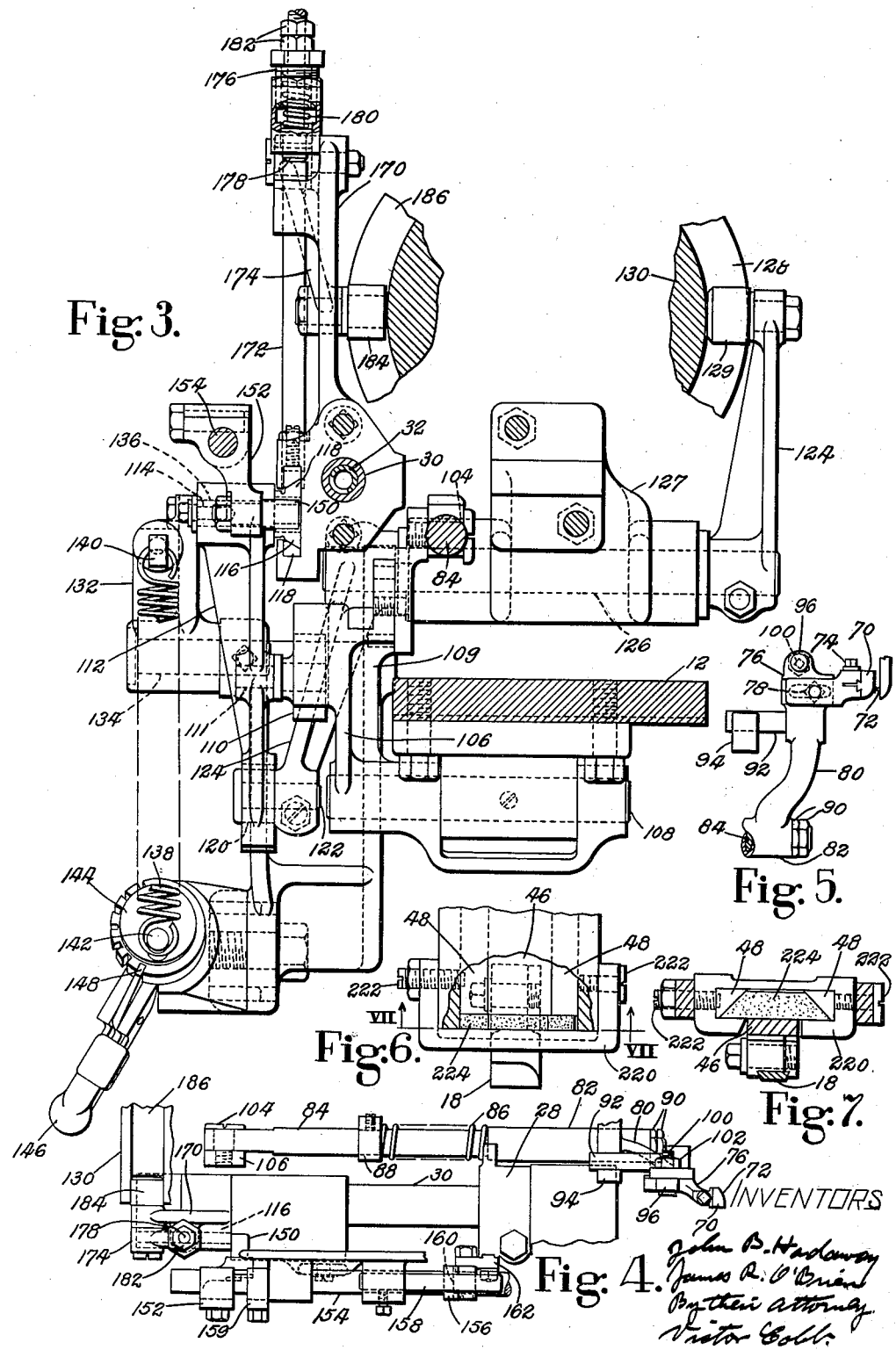

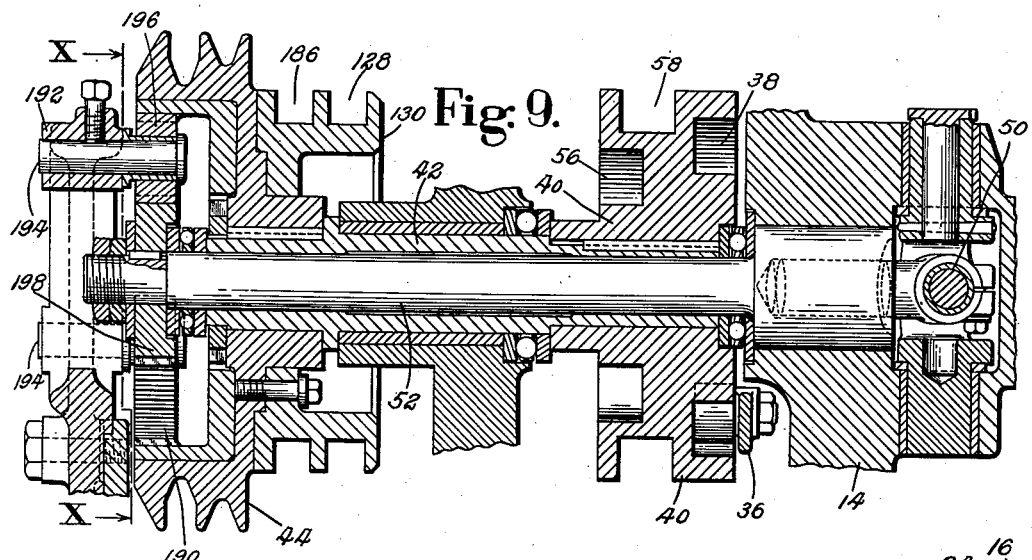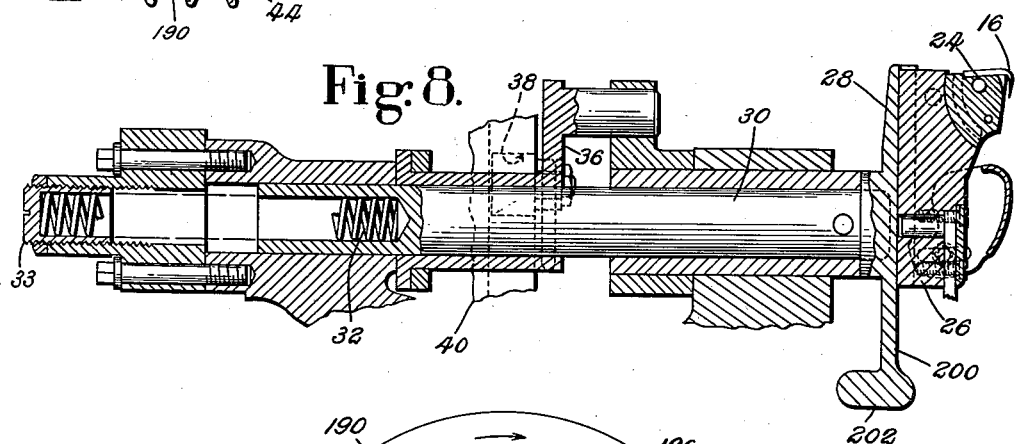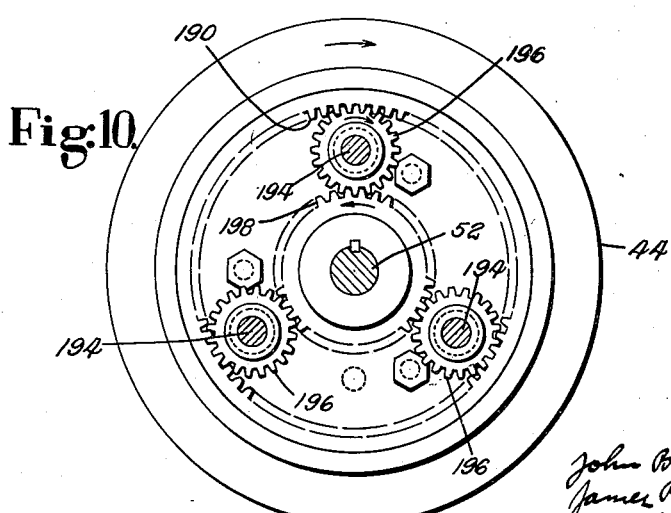

Patented Sept. 24, 1940

2,215,501

UNITED STATES PATENT OFFICE 2,215,501

MACHINE FOR OPERATING UPON SHOE SOLES

John B. Hadaway, Swampscott, and James R. O'Brien, Beverly, Mass., assignors to United Shoe Machinery Corporation, Borough of Flemington, N. J., a corporation of New Jersey Application February 27, 1939, Serial No. 258,632

41 Claims. (Cl. 12—18)

This invention relates to a machine by which there are performed upon the soles of shoes such cutting operations as the rounding or trimming of their margins and the forming of channels in the tread-surfaces. Herein, the invention is illustrated in its application to an apparatus for both rounding and channeling, and which is of the type disclosed in Letters Patent of the United States No. 1,030,606, Perry, June 25, 1912.

The invention has as an object the provision of an efficient machine which will operate smoothly and accurately, and which will hold the work securely during the cutting action, even when the width of material to be trimmed from the sole-margin is slight or is entirely absent.

In the attainment of this object, a feature of the invention involves a novel rate of actuation of the elements which operate upon the work. The members which advance the work move at a definite speed less than that of a sole-cutting knife. When this knife is that by which the sole is rounded, the greater number of severing operations for each unit of feed gives a more uniform marginal contour, especially where the direction of work-advance changes rapidly. Since the channel-knife shares in this reduced rate of feeding movement, there is less tendency for the work to become disengaged from the knife. The channel-knife, and therefore the feeding means, may be caused to perform two operating cycles for each rotation of its actuating means, this movement being communicated to the means for actuating the rounding knife at an increased speed during each of such cycles. In the illustrative form of the invention, the channel-knife is acted upon from one shaft through a cam a plurality of times for each rotation, said shaft being geared to a shaft for actuating the rounding knife a number of times similar to that of the channel-knife but at a greater speed.

As another feature of the invention, the sole-margin is clamped against a rest by a member which extends upon opposite sides of the cut made by a knife, as that for trimming said margin. This clamping member, engaging the work while sole-grasping members move oppositely to that during their advance of said work to receive the cutting action of a knife, as either that for rounding or channeling, will hold a sole firmly during knife-action, even if there is no margin left outside the line of cut. The clamping member is in the form of a presser-foot, which serves to force the margin of the sole against a guide member maintained against movement in the direction of advance of the work. To insure that the clamping effect shall be the same regardless of the thickness of the sole, this thickness is first measured, and thereafter the clamping and releasing movement of the presser-foot takes place from an initial position through a predetermined distance necessary to attain the end sought. This initial positioning is shown herein as effected under the control of the work-grasping means, as an oscillatory channel-knife-carrier and a cooperating feed-plate. More specifically, movement of the carrier is communicated to a slide and through a connecting lever-system to the presser-foot, the lever-system being also acted upon by a cam which produces the predetermined clamping movement. To avoid interference, as through play in the lever-system, the controlling influence of the measuring or work-grasping means is prevented at the time the clamping action is to be effective. This is best secured by locking the slide by which the movement of the grasping means is communicated to the presser-foot.

Further features of the invention may be found in means for steadying the channel-knife-carrier in its oscillation and for preventing tendency to excessive forward travel of the rounding knife and its carrier.

Figure 2:
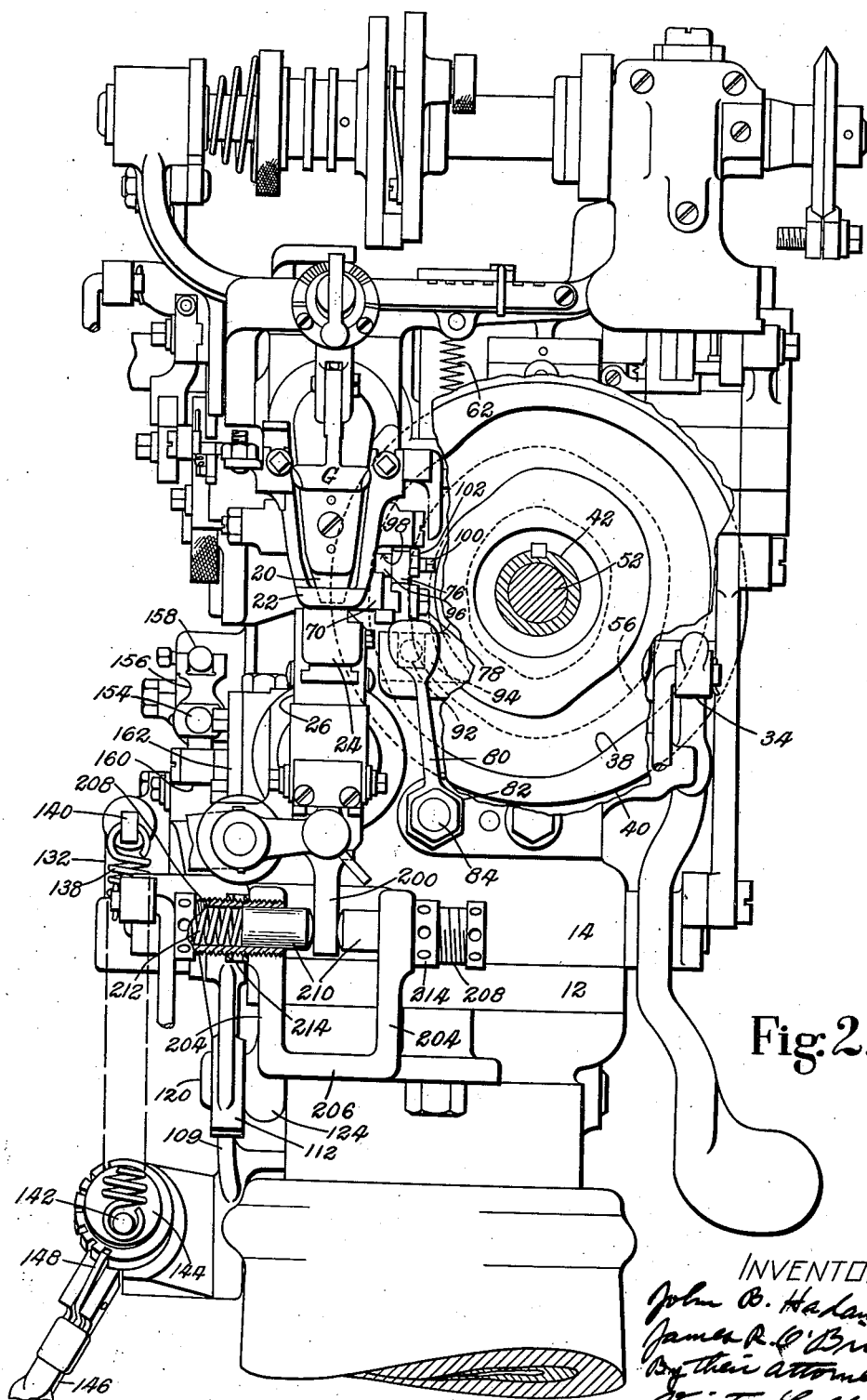

In the accompanying drawings illustrating a single embodiment of the invention,

Fig. 1 is a broken side elevation of the improved machine;

Fig. 2, a broken front elevation thereof;

Fig. 3, an irregular vertical transverse section taken through Fig. 1 just at the right of the slide controlling the presser-foot;

Fig. 4, a fragmentary plan showing the connection between the spindle of the channel-knife-block and the presser-foot;

Fig. 5, a detail in side elevation of the presser-foot and its mounting;

Fig. 6, a broken plan of the forward portion of the slide for the rounding knife;

Fig. 7, a vertical, transverse sectional detail on the line VII—VII of Fig. 6;

Fig. 8, a vertical sectional detail taken longitudinally of the spindle of the channel-knife mechanism;

Fig. 9, a similar view through the actuating shafts; and

Fig. 10, a transverse section on the line X—X of Fig. 9.

Upon the upper extremity of a column 10 is a head supporting the operating elements of the machine, this head including sections furnished by a lower plate 12 and an upper casting 14. For the purposes of the present invention, the elements of the machine which more directly cooperate with the work and which may generally be as in the previously mentioned patent, are the channel-knife 16, the rounding knife 18, the feed-plate 20 and the crease-guide or work-rest 22. The knife 16, for cutting a channel in the tread-surface of a sole, is fixed in a carrier-block 24 guided to rock upon a slide 26, which may be differently positioned vertically upon the terminal portion 28 (Fig. 8) of a spindle 30, arranged both to move longitudinally and to rock in the head. The block 24 serves as a bottom-rest for the sole being operated upon. The spindle 30 and supported parts are urged outwardly toward the feed-plate by a spring 32, situated in a bore in said spindle and between it and an adjusting screw 33 threaded into a portion of the head. Through connections at 34 (Fig. 2), the spindle may be retracted by the operator. This spindle is oscillated by a bell-crank-lever 36 from a cam-groove 38 (Fig. 9) in a disc 40, fast upon a tubular shaft 42 journaled in the machine-head and driven by a pulley 44. The rounding knife 18 for forming the margin of the sole is fixed in a slide 46 guided for horizontal reciprocation in ways in the head between gibs 48, 48 (Figs. 6 and 7). Movement of the slide is effected by connections at 50 to a shaft 52 extending through the shaft 42 and rotated as will be later explained. The feed-plate 20 is secured to a spindle 54 (Fig. 1), movable in the head and co-operating with the channel-knife and its block, in their oscillation in one direction to advance the work step-by-step, and with the rounding knife 18 to furnish a cutting bed therefor. The plate and its spindle are also shifted bodily longitudinally of the axis of the spindle to effect, with the block 24, a grasping of the work. The two movements of this spindle are respectively produced by cam-grooves 56 and 58 in the disc 40. The guide 22, which engages the crease of the shoe being operated upon, correctly positions said shoe with respect to the knives. It depends at opposite sides of the feed-plate from the forward extremities of arms 60 and is held normally raised by a tension-spring 62 (Fig. 2), it being retained against movement in the direction of work-advance.

Considering now the features more directly involved in this invention, there is added to the above-described work-engaging elements a pressure member by which the work is clamped during the cutting movements of both the channel-knife 16 and the rounding knife 18. This member is shown as in the form of a block or contact foot 70 (Figs. 1 and 5) which is situated opposite the lower portion of one side of the crease-guide 22 (Fig. 2). Its face 72, which acts to force the margin of a shoe sole toward the crease-guide, preferably extends across the line of cut of the rounding knife. It is shown as inclined or rounded at both the lower and right-hand edges to facilitate the introduction of the work to the machine and to avoid interference with the feed. The presser-foot is separably clamped by a screw 74 in a holder 76 which is secured by a slot-and-screw connection 78 to an arm 80. This arm has a horizontal tubular extension 82 surrounding a rod 84 guided to reciprocate upon the head-section 14. The arm-extension is yieldable upon the rod, a helical compression spring 86 (Fig. 4) being interposed between it and an adjustable collar 88 by which the force of the spring may be varied. This spring holds the extension normally against stop-nuts 90 threaded upon the outer extremity of the rod. In its movement, both that of yield upon the rod and reciprocation thereby, the arm 80 is held against lateral displacement by an inward projection 92 from it, this lying in a slot in a portion 94 of the head. To resist the upward thrust which the work may exert upon the presser-foot, its holder carries a rotatable roll 96 contacting with a horizontal face 98 upon the head (Fig. 2). The engagement between this surface and the roll may be adjusted by an eccentric pin 100, fixed in the holder by a nut 102 and upon which the roll is rotatable.

The end of the rod 84 opposite the arm 80 is pivoted at 104 (Figs. 1 and 3) to a primary actuating lever 106, fulcrumed at 108 upon a bracket 109 secured to the head-section 12. Between its extremities, the lever 106 has ways in which a block 110 is slidable. From the block a pin 111 projects outwardly, pivotally joining to the lever 106 an intermediate connecting lever 112, which is fulcrumed at 114 upon a slide 116 movable horizontally in ways between gibs 118, 118 upon the head-section 14. At its lower end, the lever 112 is divided to receive a block 120 in which turns a pin 122 fixed in the lower extremity of the lower arm of an actuating lever 124. The fulcrum-portion 126 connecting the spaced arms of the last-mentioned lever turns in a bracket 127 attached to the head-section 14, and its upper arm carries a roll 129 operating in a cam-groove 128 formed in the periphery of a disc 130 secured to the shaft 42. The slide 116 is held normally in a forward position by an arm 132 pivoted at 134 upon the bracket 109, it carrying a laterally projecting pin 136 at its upper end urged against the slide by a spring 138. This spring joins a forward extension 140 from the arm to an eccentric projection 142 from a cylinder 144 rotatable in a depending portion of the bracket 109. The cylindrical member may be turned to different angular positions by a hand-lever 146 and is retained by a detent device 148, thus altering the tension of the spring. This spring mechanism holds the slide against a lateral projection 150 (Figs. 1 and 4) upon an arm 152, depending from the rear of a rod 154 mounted to slide upon the head-section 14 and held against rotation in its guides by a terminal-portion 156 fixed to its forward end and embracing a horizontal pin 158 secured upon the head. Forward movement of the rod 154 is limited by contact of a collar 159 fast upon it with a portion of the head. Below the rod, the terminal 156 receives engagement of a roll 160 rotatable upon a plate 162 attached to the terminal 28 of the spindle 30 for the channel-knife-block 24. By the action of the spring 138 upon the slide 116, the rod 154 and the spindle 30 are held yieldably in a forward position, ready for retraction upon rearward movement of the channel-knife-block. At the same time, the action of the spring upon the slide is urging forward the fulcrum 114 of the intermediate lever 112. This, in turn, effects similarly the connection 111 to the primary actuating lever 106, which, through the rod 84 and spring 86, forces the presser-foot 70 toward the crease-guide 22, its position being dependent upon that of the channel-knife-block.

With the machine in operation, the secondary actuating lever 124, under the influence of its cam-groove 128, is oscillating the primary lever 106 through connection 111 to the intermediate lever 112, so it periodically reciprocates the rod 84. This first forces the presser-foot 70 toward the crease-guide to clamp the margin of the sole and hold it to receive the action of the channel-knife 16 and the rounding knife 18, and then withdraws said presser-foot to free the work for advance by the oscillation of the channel-knife-block 24 and the feed-plate 20. The last-mentioned movement of the presser-foot is to an extent predetermined by the contour of the cam-groove 128, this being sufficient to fully relieve the work of the clamping action of said presser-foot, including an allowance for the expansion of the released material. When the operator draws back the channel-knife-block by the connections 34 for the introduction of the work, the roll 160 moving with the spindle 30 shifts rearwardly the rod 154 and therefore the slide 116. Without interference with the operating movement of the presser-foot, the fulcrum 114 of the intermediate lever 112 is correspondingly carried back and with it connection 111 of the primary lever 106. The ratio of the lever-arms is such that the presser-foot is retracted from the crease-guide 22 by the amount substantially equal to the movement of the channel-knife-block. There is thus left free a space for the application of the work to the crease-guide.

The oscillation of the elements of the lever-system especially after wear is introduced in the use of the machine, may cause a variation in the position of the slide 116, which would interfere with the correct timing of the presser-foot with respect to the co-operating elements and therefore might affect the uniform feed of the work. This is avoided by locking the slide against movement while the presser-foot is in its work-clamping relation, its control by the channel-knife-block 24 being thereby prevented. Guided for vertical reciprocation in a bracket 170 fixed to the head is a rod 172, engaging at its lower end the upper gib 118 of the slide. Fulcrumed upon the bracket is a bell-crank-lever 174, through the upper arm of which is threaded a casing 176 having movable in it a plunger 178. An expansion spring 180 surrounds the plunger within the casing and forces said plunger against the top of the rod 172 and the lower extremity of said rod against the gib of the slide. Nuts 182, threaded upon the plunger above the casing, permit the height of said plunger and the force of the spring to be varied so its action upon the rod may be modified. The lower arm of the lever 174 carries a roll 184 situated in a cam-groove 186 in the disc 130. The contour of the cam-groove is such that, when the presser-foot is urged toward the crease-guide 22 to retain the work against movement, the plunger 178 depresses the rod against the gib to lock the slide against displacement in its ways. During the period of work-advance, the plunger rises for a sufficient time to free the rod, so the slide may be moved for the retraction and succeeding advance of the presser-foot.

In applying power to the operating elements, the shaft 42 may be driven at the usual speed for a machine of this character, but the various cam-grooves in the discs 40 and 130 are designed to produce a complete operating cycle for each 180° of rotation. The resulting form of the grooves 38 and 56 may be seen in Fig. 2. The contour of the two sections of these grooves is such as to cause the respective movements of the channel-knife-block 24 and the feed-plate 20 through a less relative distance than is customary, though the rate of the feed-periods has been doubled. By arranging the cam-grooves to give a double cycle for a single turn of the shaft, rather than by increasing the speed of rotation, an actuating mechanism results in which there are no abrupt changes in cam-contour and which will operate smoothly and without undue wear. To produce a similar two-cycle action of the rounding knife 18 for each rotation of the shaft 42, the inner shaft 52, which actuates the connection 50 for the rounding knife, is driven at a greater angular speed than that of said shaft 42. To that end, it is joined to the shaft through two-to-one gearing. As herein illustrated, the pulley 44, by which the shaft 42 is driven, carries an internal gear 190 (Figs. 9 and 10). Secured to the rear of the head-section 12 is a bracket provided with an annular portion 192, in which are fixed three horizontal stub-shafts 194 extending within the gear 190 and spaced from one another by 120°. Upon these shafts rotate three pinions 196 meshing both with the gear 190 and with a gear 198 fast upon the shaft 52. Because the thus-actuated rounding knife acts more frequently than heretofore during each unit of work-advance, although the definite time-relation between its periods of operation and those of the channel-knife remain the same, the edge formed upon the sole is smoother, particularly where the direction of curvature of the periphery changes rapidly. Moreover, with the relatively short movements for cutting the channel and advancing the work, said work is less likely to become separated from the channel-knife 16.

As the elements wear in the operation of the machine, there is introduced a looseness of the actuating connections for the channel-knife-block 24. They may not only become noisy, but the wear tends to increase. To guard against this, there depends from the spindle-portion 28, which carries the slide 26 of the channel-knife-block, an arm 200 upon the lower end of which is an enlargement 202 (Fig. 8) extending longitudinally of the spindle 30. The arm lies between opposite walls 204, 204 upon a bracket 206 (Fig. 2) attached to the head-section 12. Threaded into opposite openings in the walls are casings 208, 208 in each of which a plunger 210 is movable. Within each casing, interposed between its outer end and the plunger, is an expansion-spring 212, the force of which is controlled by the position of the casing. A check-nut 214, threaded upon each casing and engaging the wall 204, holds said casing in place. Whatever the position of the spindle-terminal 28, the plungers 210 will be forced by their springs into constant engagement with the arm-enlargement 202, steadying the parts in their oscillation and acting to reduce the noise and wear caused by lost motion.

The momentum of the slide 46 with the chopping knife 18 may, as the actuating elements wear, cause overthrow, so the cutting edge of the knife will indent the soft-metal anvil upon the feed-plate 20 against which it acts. As this occurs, the knife is more rapidly dulled, the cut in the sole becomes less clean and the anvil requires frequent renewal. This, as shown in Figs. 6 and 7, is remedied by placing at the end of the ways in the head for the knife-slide a retaining yoke 220, clamped upon the head by opposite screws 222, 222. Between the yoke and the forward extremity of the ways, a cushion 224 of rubber or other yieldable material is interposed. Against this cushion the slide will strike when any tendency to overthrow develops, being retarded so the impact of the cutting edge of the knife against the anvil is lessened.

In the use of the machine, the operator, through the connections 34 and against the force of the spring 32, draws the channel-knife-block 24 back from the feed-plate 20 and the crease-guide 22, this, through the rod 154 and its connections, forcing rearwardly the slide 116. By the action of the intermediate lever 112 and the primary actuating lever 106, the presser-foot 70 is correspondingly retracted under the control of the block 24 from its active co-operation with the inner face of the crease-guide. The withdrawal of the presser-foot is against the force of the spring 138 exerted upon the slide through the arm 132. In the space resulting from the retraction of the block and presser-foot, the margin of the sole to be operated upon is inserted to the extent determined by the engagement of the crease between the sole and the shoe-upper with the guide 22, this engagement being initially at the breast-line. The proper relation of the work to the operating elements is thereby determined. Upon release of the connections 34, the spring 32 and the spring 138, by its action upon the slide, respectively carry the channel-knife-block and the presser-foot outwardly ready to grasp, with the crease-guide and feed-plate respectively, the sole-margin. When the rounding knife 18 moves out to sever a section of the sole-margin and the channel-knife 16 swings to the right, as viewed from the front of the machine, to cut a section of the channel, the presser-foot, actuated from the cam-groove 128 through the secondary lever 124, intermediate lever 112 and the primary lever 106, has securely clamped the margin of the sole against the crease-guide to resist displacement of the work by either of the knives. This clamping force is yieldably applied, by virtue of the interposed spring 86. Even if there is little or none of the margin outside the cut of the rounding knife, the hold upon the work will still be secure because of the engagement of the presser-foot with the sole at the inner side of the cut. In this connection, such a shoe-part as a welt may be considered as a portion of the sole. If there is sufficient width of sole, the presser-foot may be aided in the retention by the presence of the rounding knife in the margin. At this time, the slide 116 has been locked by the rod 172 controlled by the cam-groove 186, so the clamping effect upon the sole will not be interfered with by movement of the fulcrum 114 of the lever 112. In preparation for the reverse movement of oscillation of the block 24 with the channel-knife, during their co-operation with the feed-plate 20 to advance the work a step prior to the next cut of the knives, the cam-groove 186 frees the rod 172 to unlock the slide. Then, the cam-groove 128 through the levers 124, 112 and 106, retracts the presser-foot to the predetermined extent insuring release of the work. The position of the channel-knife-block in its movement transversely of the sole-edge, and therefore of the rod 154 and the projection 150, which determines the location of the slide, depends upon the thickness of the engaged work. This effects a measurement, in accordance with which the presser-foot controlled from the slide through the levers 112 and 106 will be correspondingly initially positioned. Therefore, the cam-controlled movement of the presser-foot, through its fixed distance from this initial position, will always separate it to the same extent from the engaged surface, regardless of the thickness of the sole-edge. The measuring and positioning action continues throughout the operation upon the work, as this thickness varies and the block is moved by or against its spring 32. Upon completion of the feed, the operating cycle, comprising clamping, cutting, unclamping and feeding, is repeated. During operation upon the forepart-margin, the well-known gage G, with its mechanism for governing the width of the margin, may be brought into action. This mechanism, however, plays no part in the present invention. As the advance of the work by the cam-grooves 38 and 56, compared with the rate of action of the rounding knife, is slower than in previous practice, a smoother edge is formed, and because of the reduced travel of the channel-knife, disengagement of the work from said channel-knife is avoided. Yet, because of the doubling of the operating cycle during a single rotation of the driving shaft, the production-rate is not decreased, and efficient actuation is insured. The provision of the cushion 224 and the plungers 210, 210, respectively eliminate overthrow of the rounding knife and the effect of lost motion in the channeling mechanism.

Having described our invention, what we claim as new and desire to secure by Letters Patent of the United States is:

1. In a rounding and channeling machine, a reciprocatory rounding knife, an oscillatory channel-knife, movable means for oscillating the channel-knife, means for reciprocating the rounding knife, and means for communicating movement of the channel-knife to the rounding knife at a definite increased speed.

2. In a rounding and channeling machine, a movable rounding knife, a movable channel-knife, rotatable means for actuating the channel-knife through two operating cycles during each rotation of said means, and means for communicating movement of the channel-knife-actuating means to the actuating means for the rounding knife at an increased speed.

3. In a rounding and channeling machine, a movable rounding knife, a movable channel-knife, a rotatable shaft for actuating each knife, gearing connecting the shafts and having a two-to-one ratio, and means upon one of the shafts through which its knife is actuated twice for each rotation.

4. In a rounding and channeling machine, a movable rounding knife, a movable channel-knife, a tubular shaft for actuating one of the knives, a shaft situated within the tubular shaft for actuating the other knife, and gearing connecting the shafts.

5. In a rounding and channeling machine, a movable rounding knife, a movable channel-knife, a rotatable tubular shaft, a cam thereon arranged to actuate the channel-knife a plurality of times for each rotation, a shaft situated within the tubular shaft and joined to the rounding knife, and gearing connecting the shafts and arranged to rotate the shaft of the rounding knife at greater speed than that of the channel-knife.

6. In a machine for operating upon shoe soles, two movable knives for cutting a sole, a tubular shaft, connections to the shaft for moving one of the knives, a shaft within the tubular shaft, connections to the inner shaft for moving the other knife, means for rotating one of the shafts, and means for communicating the rotation thereof to the other shaft.

7. In a machine for operating upon shoe soles, two movable knives for cutting a sole, a tubular shaft, connections to the shaft for moving one of the knives, a shaft within the tubular shaft, connections to the inner shaft for moving the other knife, means for rotating one of the shafts, an internal gear upon the tubular shaft, a gear upon the other shaft, and an intermediate pinion meshing with both gears.

8. In a machine for operating upon shoe soles, a frame, a rounding knife mounted for reciprocation upon the frame, a channel-knife mounted for oscillation upon the frame, a tubular shaft journaled in the frame and connected to the channel-knife, a shaft journaled within the tubular shaft and joined to the rounding knife, gears fixed to the shafts, and pinions rotatable upon the frame and connecting the shafts.

9. In a machine for operating upon shoe soles, a knife for cutting a sole, opposite members movable to grasp the sole and movable together to advance said sole to receive the action of the knife, a work-guide held against movement in the direction of work-advance, and a member movable to clamp the sole against the guide.

10. In a machine for operating upon shoe soles, a knife for cutting a sole, opposite members movable to grasp the sole and movable together to advance said sole to receive the action of the knife, a work-guide held against movement in the direction of work-advance, and a member movable to clamp the sole against the guide and engaging said sole at opposite sides of the cut made by the knife.

11. In a machine for operating upon shoe soles, a knife for cutting a sole, opposite oscillatory members relatively movable to grasp the sole, means for oscillating the members together to advance the sole to receive the action of the knife, a work-guide maintained against oscillation, and a member movable to clamp the sole against the guide during the oscillation of the members in the opposite direction to that of work-advance.

12. In a rounding and channeling machine, a rounding knife and a channel-knife movable to cut a sole, opposite members relatively movable to grasp the sole and movable together to advance said sole to receive the action of the knives, a crease-guide held against movement in the direction of work-advance, and a member movable to clamp the sole against the crease-guide before the knives begin to cut the sole.

13. In a rounding and channeling machine, an oppositely movable carrier, a channel-knife mounted thereon, a feed-plate movable with the carrier in one direction to advance the work, a rounding knife operating against the feed-plate as a cutting bed, a crease-guide having spaced arms between which the feed-plate is movable, and a presser-foot situated opposite one of the arms of the crease-guide and movable toward and from said arm during the return of the carrier and the feed-plate for the advance of the work.

14. In a machine for operating upon shoe soles, a knife for cutting a sole, two sole-engaging members movable toward and from the sole, one of said sole-engaging members determining the approach of the other to the sole, and means for moving said other member independently of such action of approach.

15. In a machine for operating upon shoe soles, a knife for cutting a sole, two members movable into and out of engagement with the sole, one of said members controlling the position of the other, means for moving said other member independently of such positioning action, and means for preventing the control of the member during the independent movement.

16. In a machine for operating upon shoe soles, a knife for cutting the work, movable means for grasping the work and thereafter acting upon it in co-operation with the knife, and means movable to clamp the work while the knife cuts, there being means for measuring the thickness of the work to determine therefrom the initial position of the clamping means.

17. In a machine for operating upon shoe soles, a knife for cutting the work, movable means for grasping the work and thereafter acting upon it in co-operation with the knife, and means movable independently of the grasping means to clamp the work while the knife cuts, the initial position of the clamping means being determined by the grasping means.

18. In a machine for operating upon shoe soles, a knife for cutting a sole, opposite members for clamping the sole-margin while the knife makes its cut, and means for moving the opposite members relatively toward and from each other to clamp and release the work, the movement of one of the members being through a predetermined distance from the surface of the sole which it engages.

19. In a machine for operating upon shoe soles, a knife for cutting the work, movable means for grasping the work and thereafter acting upon it in co-operation with the knife, means movable to clamp the work to receive the cut of the knife, there being means for measuring the thickness of the work to determine therefrom the initial position of the clamping means, and means for imparting to the clamping means its work-clamping movement from such predetermined position.

20. In a machine for operating upon shoe soles, a knife for cutting the work, movable means for grasping the work and thereafter acting upon it in co-operation with the knife, means movable to clamp the work to receive the cut of the knife, there being means for measuring the thickness of the work to determine therefrom the initial position of the clamping means, means for imparting to the clamping means its work-clamping movement from such predetermined position, and means for preventing action of the measuring means during the clamping of the work.

21. In a machine for operating upon shoe soles, a knife for cutting the work, movable means for grasping the work and thereafter acting upon it in co-operation with the knife, means movable independently of the grasping means to clamp the work while the knife cuts, the initial position of the clamping means from which such independent movement occurs being determined by the grasping means, and means for imparting to the clamping means its independent movement.

22. In a machine for operating upon shoe soles, a knife for cutting the work, a sole-grasping member arranged for retraction to admit the work and thereafter movable to advance it, a clamping member movable by the grasping member during its retraction, and means for causing the clamping member to follow the grasping member during its grasping movement.

23. In a machine for operating upon shoe soles, a feed-plate, a channel-knife-carrier and its channel-knife movable toward and from the feed-plate to grasp and release a sole, and a member movable relatively to the carrier to clamp the sole and being movable by the carrier in preparation for the clamping movement.

24. In a machine for operating upon shoe soles, a work-guide, a movable feed-plate, a knife and its carrier movable in one direction to cut a sole and in the opposite direction with the feed-plate to advance the work, the carrier and knife being also movable toward and from the guide, a movable clamping member co-operating with the guide, means for moving the clamping member under the control of the carrier, and means for moving the thus-controlled member through a predetermined distance toward and from the guide.

25. In a machine for operating upon shoe soles, a feed-plate, a channel-knife-carrier and its channel-knife movable toward and from the feed-plate to grasp and release a sole, a reciprocatory member for clamping the sole and being movable by the carrier in preparation for the clamping movement, and a cam for reciprocating the clamping member.

26. In a machine for operating upon shoe soles, a knife for cutting a sole, a sole-engaging member variable in position under the influence of the sole and acting in co-operation with the knife, a reciprocatory clamping member for the sole, means for reciprocating the clamping member, and an intermediate member movable by the engaging member as the position of said engaging member is varied and connected to the reciprocating means and to the clamping member.

27. In a machine for operating upon shoe soles, a knife for cutting a sole, a sole-engaging member variable in position under the influence of the sole and acting in co-operation with the knife, a reciprocatory clamping member for the sole, means for reciprocating the clamping member, an intermediate member movable by the engaging member as the position of said engaging member is varied and connected to the reciprocating means and to the clamping member, and means for locking the intermediate member against movement during the reciprocation of the clamping member.

28. In a machine for operating upon shoe soles, a knife for cutting a sole, a sole-engaging member variable in position under the influence of the sole and acting in co-operation wtih the knife, a reciprocatory clamping member for the sole, means for reciprocating the clamping member, and a lever having a fulcrum movable by the engaging member and connected to the reciprocating means and to the clamping member.

29. In a machine for operating upon shoe soles, a knife for cutting a sole, a sole-engaging member variable in position under the influence of the sole and acting in co-operation with the knife, a reciprocatory clamping member for the sole, means for reciprocating the clamping member, a lever having a fulcrum movable by the engaging member and connected to the reciprocating means and to the clamping member, and cam-actuated means for locking the fulcrum of the lever against movement by the engaging member.

30. In a machine for operating upon shoe soles, a channel-knife, an oscillatory carrier for the knife movable in engagement with the work and transversely thereof, a slide movable by the carrier in its transverse movement, a lever fulcrumed upon the slide, and a presser-foot movable by the lever toward and from the work.

31. In a machine for operating upon shoe soles, a channel-knife, an oscillatory carrier for the knife movable in engagement with the work and transversely thereof, a slide movable by the carrier in its transverse movement, a spring acting upon the slide to move it in the opposite direction, a lever fulcrumed upon the slide, and a presser-foot movable by the lever toward and from the work.

32. In a machine for operating upon shoe soles, a channel-knife, an oscillatory carrier for the knife movable in engagement with the work and transversely thereof, a slide movable by the carrier in its transverse movement, a lever fulcrumed upon the slide, means for oscillating the lever about its fulcrum, and a presser-foot movable by the lever toward and from the work.

33. In a machine for operating upon shoe soles, a channel-knife, an oscillatory carrier for the knife movable in engagement with the work and transversely thereof, a presser-foot movable toward and from the work, a slide movable by the carrier in its transverse movement, a lever fulcrumed upon the slide, a cam-actuated lever for oscillating the slide-lever, and a lever communicating the movement of the slide-lever to the presser-foot.

34. In a machine for operating upon shoe soles, a channel-knife, an oscillatory carrier for the knife movable in engagement with the work and transversely thereof, a slide movable by the carrier in its transverse movement, a cam-actuated-lever for locking the slide, a lever fulcrumed upon the slide, and a presser-foot movable by the slide-lever toward and from the work.

35. In a machine for operating upon shoe soles, a channel-knife, an oscillatory carrier therefor, and opposite yieldable members, one of said members being displaceable by the carrier during its oscillatory movement in each direction.

36. In a machine for operating upon shoe soles, a channel-knife, an oscillatory carrier therefor, opposite yieldable members, one of said members being displaceable by the carrier during its oscillatory movement in each direction, and means arranged to vary the force of each yieldable member.

37. In a machine for operating upon shoe soles, a channel-knife, an oscillatory carrier therefor, an arm extending from the carrier, and spring-plungers situated at opposite sides of the arm and engaged thereby during the oscillation of the carrier.

38. In a machine for operating upon shoe soles, a rounding knife, a movable carrier therefor, and a yieldable member for engagement by the carrier near the termination of the cutting movement of the knife and interposed between said carrier and a relatively fixed point.

39. In a machine for operating upon shoe soles, a rounding knife, a reciprocatory member upon which the knife is mounted, and a cushion with which the member contacts near the termination of the cutting stroke of the knife.

40. In a machine for operating upon shoe soles, a frame provided with ways, a slide movable in the ways, a rounding knife mounted upon the slide, a retaining member situated across the end of the ways, and a cushion held against the retaining member in the path of the slide.

41. In a rounding and channeling machine, a rounding knife, a reciprocatory carrier therefor, a channel-knife, an oscillatory carrier therefor, a yieldable member compressible in the movement of the carrier for the rounding knife, and opposite yieldable members movable by the channel-knife-carrier.

JOHN B. HADAWAY.
                JAMES R. O'BRIEN.